US006530131B1

(12) United States Patent
Hopkins

(10) Patent No.: US 6,530,131 B1
(45) Date of Patent: Mar. 11, 2003

(54) TOOL LEASH DEVICE

(75) Inventor: William Hopkins, San Clemente, CA (US)

(73) Assignee: Fastening Solutions, Inc., Tarzana, CA (US)

( * ) Notice: Subject to any disclaimer, the term of this patent is extended or adjusted under 35 U.S.C. 154(b) by 0 days.

(21) Appl. No.: 10/081,440

(22) Filed: Feb. 20, 2002

(51) Int. Cl.[7] ............................ A44B 21/00; F16L 3/00

(52) U.S. Cl. ............................ 24/300; 24/301; 24/3.13; 248/51

(58) Field of Search ............................ 24/298–302, 323, 24/3.13, 3.2, 3.7; 248/51, 52; 224/220, 221; 119/769, 770, 793, 795, 798

(56) References Cited

U.S. PATENT DOCUMENTS

| | | | | | |
|---|---|---|---|---|---|
| 1,957,577 | A | * | 5/1934 | Chapman | |
| 2,994,300 | A | * | 8/1961 | Grahling | 24/300 X |
| 3,908,875 | A | | 9/1975 | Wilson et al. | |
| 4,479,785 | A | * | 10/1984 | Tugwood et al. | 441/75 |
| 4,688,564 | A | * | 8/1987 | Kelly | 128/878 |
| 4,728,123 | A | | 3/1988 | Kassal et al. | |
| 4,998,507 | A | | 3/1991 | Browning | |
| 5,077,927 | A | | 1/1992 | Derryberry | |
| 5,082,156 | A | | 1/1992 | Braun | |
| 5,351,346 | A | | 10/1994 | Hodges, Jr. | |
| 5,394,592 | A | | 3/1995 | Quick | |
| 5,695,380 | A | | 12/1997 | Morrison | |
| 5,722,125 | A | * | 3/1998 | Vasilopoulos | 24/301 |
| 5,815,977 | A | | 10/1998 | Hill, Jr. | |
| 6,000,103 | A | * | 12/1999 | Paice et al. | 24/10 R |
| 6,216,319 | B1 | | 4/2001 | Elkins | |
| D455,527 | S | * | 4/2002 | Epstein | D30/153 |
| 6,427,374 | B1 | * | 8/2002 | Vaiani | 42/85 |

* cited by examiner

*Primary Examiner*—Robert J. Sandy
(74) *Attorney, Agent, or Firm*—Oppenheimer Wolff & Donnelly LLP

(57) ABSTRACT

A tool leash device having at least one coiled leash having a closed loop at one end secured to a split key ring, a snap ring having a selectively opened and closed locking member secured to said split key ring for attachment to a belt loop or the like, a trigger snap connected to the other end of the coiled leash having a selectively opened and closed locking member for securing the same to a closed loop portion of a flexible tie wrap, and a flexible elongated tie wrap having a closed loop portion at one end connected to said trigger snap locking member having a generally smooth end at the other end thereof with a ribbed portion between the ends of said tie wrap and an apertured locking portion on the tie wrap between the ends thereof whereby the smooth end is insertible into the locking portion with the ribbed portion locking into the locking portion for serving a tool thereto.

9 Claims, 2 Drawing Sheets

FIG. 2
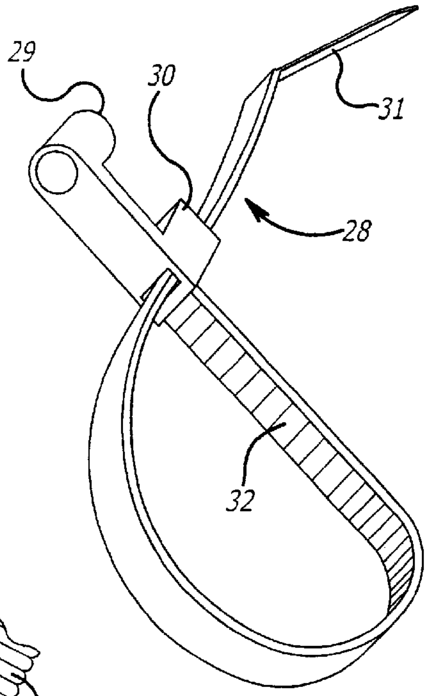
FIG. 4
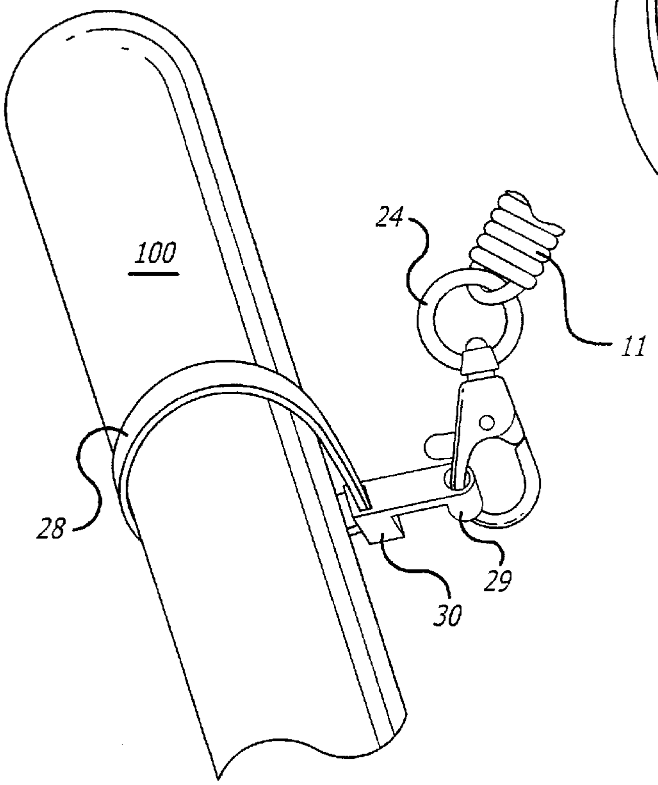
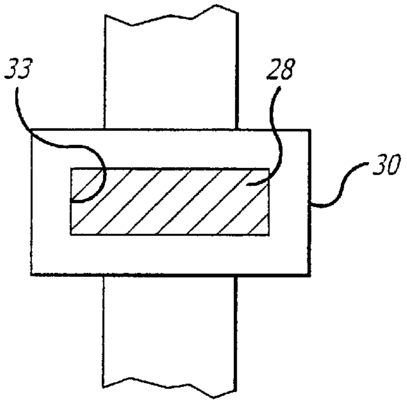
FIG. 3

TOOL LEASH DEVICE

BACKGROUND OF THE INVENTION

The invention relates to releasable strap systems; and, more particularly, to a tool leash device for releasably attaching a tool thereto which device can be hooked to a belt loop or the like.

RELATED ART

Hand tools and other equipment are sometimes used in environments where, if they are accidentally dropped while being used, are difficult to retrieve. For example, one working on the roof of a house might drop a screwdriver or the like to the ground. One working on a boat or the like may drop a tool into the water. Boats also present additional problems in that one's hands may be wet when using a tool. Further, it may be necessary to use more than one tool which thus creates the added problem of having different tools available and switching from one to the other.

There is thus a need for a device which can hold a tool in a ready accessible location and enable the user to regain use of it if it is dropped or the like.

SUMMARY OF THE INVENTION

It is an object of this invention to provide a device for attaching one or more tools or the like to flexible coiled leashes attached to a belt or the like.

It is an object of this invention to carry out the foregoing object using flexible tie wraps connected to the coiled leashes. These and other objects are preferably accomplished by providing a tool leash device attachable to a belt loop or the like having at least one coiled leash with a flexible tie wrap at the free end thereof adapted to wrap around a tool or the like.

BRIEF DESCRIPTION OF THE DRAWING

FIG. 2 is a detailed view of a portion of the device of FIG. 1 illustrating the locking feature thereof;

FIG. 3 is a cross-sectional view of a portion of the device of FIG. 2; and FIG. 4 is a perspective view of a portion of the device of FIG. 1 illustrating the locking of a tool thereto.

DESCRIPTION OF THE PREFERRED EMBODIMENT

Figure 1:
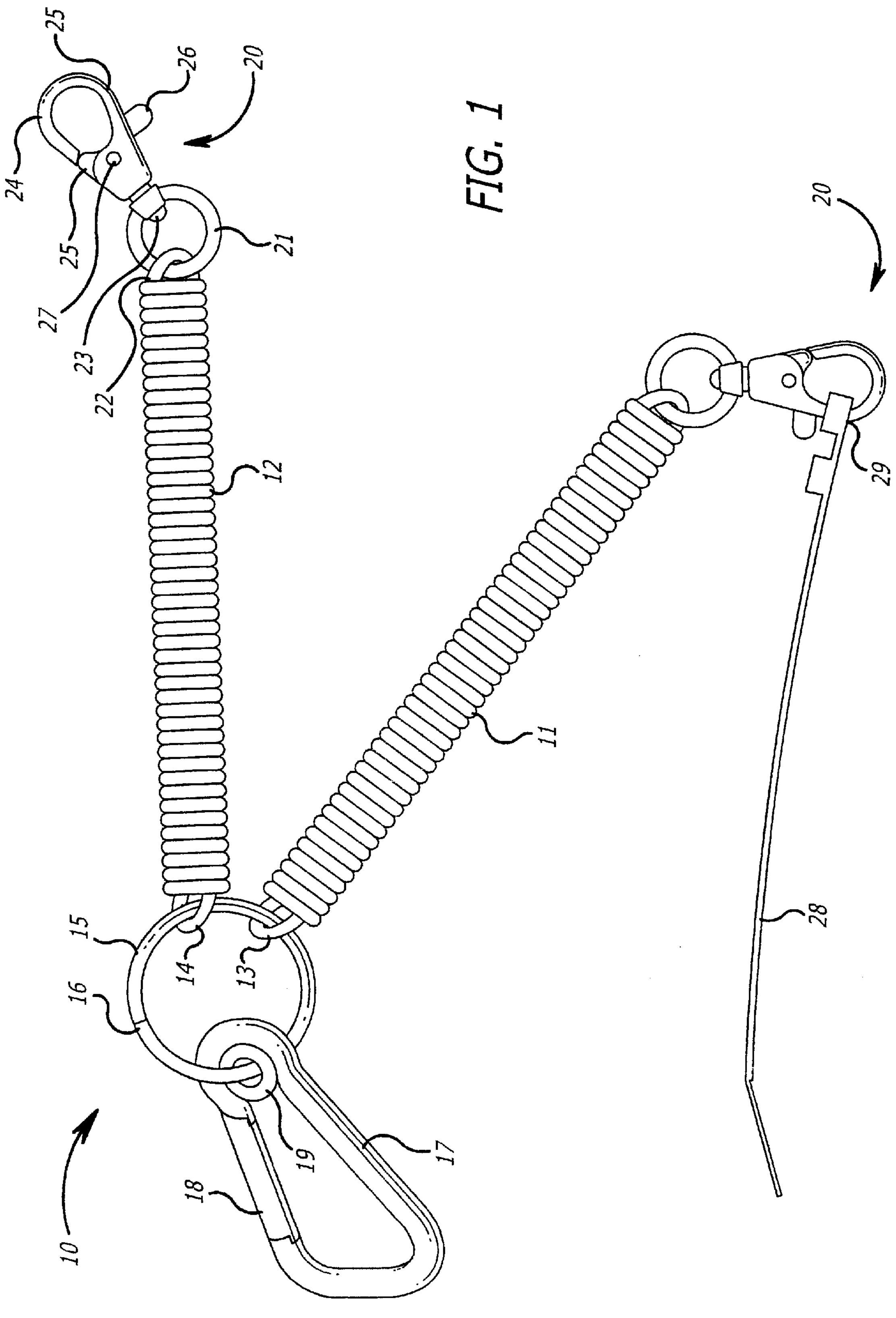
FIG. 1 is a perspective view of the tool leash device in accordance with the teaching of the invention.

Referring now to FIG. 1 of the drawing, a tool leash device 10 is shown including at least a pair of coiled leashes 11, 12 each having its terminal closed loop 13, 14, respectively, secured to a split key ring 16. This may be accomplished in the usual manner by inserting the split end 16 of ring 15 through loops 13, 14.

An asymmetric snap ring 17 is provided having a spring biased locking member 18 which, when pushed internally of ring 17, opens the same for attachment of ring 17 to a belt loop or the like (not shown). Ring 17 has a integral ring loop 19 through which split ring 15 extends again utilizing the split end 16 of ring 15 as is well known in the art.

Each coiled leash 11, 12 terminates in a conventional trigger snap 20. Snaps 20 are identical and each has a closed ring portion 21 receiving thereon a closed loop end 22 of each leash 11, 12. Ring portion 21 is swivelly connected at swivel 23 to snap hook portion 24. Snap hook portion 24 is swivelly connected to swivel 23 and has a spring biased portion 25 for selectively opening and closing hook portion 24 activated by lever 26 which is connected to portion 25 and pivots about pivot 27 all as is well known in the art.

Each snap 20 may have a tie wrap, which may be of plastic or other flexible material, connected thereto. Only one tie wrap 28 is shown in FIG. 1.

Tie wrap 28 is an elongated strip having a closed loop portion 29 at one end through which snap hook portion 24 extends by releasing lever 26 to open portion 25.

Tie wrap 28 has an apertured locking portion 30 (FIG. 2) for receiving therethrough the free end 31 of tie wrap 28. This end 31 is generally smooth but the remainder of the tie wrap 28, from end 31 to locking portion 30, may be ribbed or ridged, as at spaced ridges 32 so that, when end 31 is inserted through the opening 33 in locking portion 30 (see also FIG. 3) and pulled therethrough, the ridges 32 lock the tie wrap 28 within locking portion 30 as is well known in the tie wrap art.

It can be seen in FIG. 4 that tie wrap 28 can be quickly and easily wrapped around a tool, such as handle 100 of a tool, and tightened by pulling tie wrap 28 through locking portion 30 as heretofore discussed thus locking and retaining handle 100 to coiled leash 12. The user can attach more than one tool to device 10 using another tie wrap 28 on the other coiled leash 12.

Although a particular embodiment of the invention is disclosed, variations thereof may occur to an artisan and the scope of the invention should only be limited by the scope of the appended claims.

I claim:

1. A tool leash device comprising:

at least one coiled leash having a closed loop at one end secured to a split key ring;

a snap ring having a selectively opened and closed locking member secured to said split key ring for attachment to a belt loop;

a trigger snap connected to the other end of said coiled leash having a selectively opened and closed locking member for securing the same to a closed loop portion of a flexible tie wrap; and a flexible elongated tie wrap having a closed loop portion at one end connected to said trigger snap locking member having a generally smooth end at the other end thereof with a ribbed portion between said ends of said tie wrap and an apertured locking portion on said tie wrap between said ends thereof whereby said smooth end is insertible into said locking portion with said ribbed portion locking into said locking portion.

2. The tool leash device of claim 1 including a second coiled leash having a closed loop at one end secured to said split key ring, said second coiled leash having a snap ring with a selectively opened and closed locking member secured to said split key ring for attachment to a belt loop, and a trigger snap connected to the other end of said coiled leash having a selectively opened and closed locking member for securing the same to a closed loop portion of flexible tie wrap.

3. The device of claim 1 wherein said snap ring is an asymetrical snap ring.

4. The device of claim 1 wherein said snap ring has a spring biased lever for opening and closing the same.

5. The device of claim 3 wherein said snap ring has a spring biased lever for opening and closing the same.

6. The device of claim 1 wherein said locking member of said trigger snap is spring biased.

7. The device of claim 2 wherein said snap ring is an asymetrical snap ring.

8. The device of claim 7 wherein said snap ring has a spring biased lever for opening and closing the same.

9. The device of claim 8 wherein said locking member of said trigger snap is spring biased.

* * * * *